United States Patent [19]
Ishizuka et al.

[11] 4,455,323
[45] Jun. 19, 1984

[54] PROCESS FOR THE PREPARATION OF RADIOGRAPHIC INTENSIFYING SCREEN

[75] Inventors: Akio Ishizuka, Fujinomiya; Akira Kitada, Kaisei, both of Japan

[73] Assignee: Fuji Photo Film Co., Ltd., Kanagawa, Japan

[21] Appl. No.: 506,391

[22] Filed: Jun. 21, 1983

[30] Foreign Application Priority Data

Jun. 22, 1982 [JP] Japan .................................. 57-106187

[51] Int. Cl.³ ............................ H01J 1/62; H01J 1/64
[52] U.S. Cl. .......................................... 427/65; 427/73
[58] Field of Search ..................................... 427/65, 73

[56] References Cited

U.S. PATENT DOCUMENTS 2,684,306  7/1954  Brewer et al. .................. 427/65 X Primary Examiner—James R. Hoffman
Attorney, Agent, or Firm—Gerald J. Ferguson, Jr.; Joseph J. Baker

[57] ABSTRACT

A process for the preparation of a radiographic intensifying screen comprising a support and a phosphor layer, which comprises:
preparing a coating dispersion containing phosphor particles, a particulate hydrophobic silica in an amount of not more than 2% by weight of the phosphor particles, and a binder; and
applying the coating dispersion onto the support to form a phosphor layer.

4 Claims, No Drawings

PROCESS FOR THE PREPARATION OF RADIOGRAPHIC INTENSIFYING SCREEN

BACKGROUND OF THE INVENTION

1. Field of the Invention

This invention relates to a process for the preparation of a radiographic intensifying screen.

2. Description of the Prior Art

In a variety of radiography such as medical radiography for diagnosis and industrial radiography for nondistructive inspection, a radiographic intensifying screen is generally employed in close contact with one or both surfaces of an X-ray film for enhancing the speed of the radiographic system. The radiographic intensifying screen comprises a support and a phosphor layer provided thereon. A transparent film is generally provided on the free surface of the phosphor layer to keep the phosphor layer from chemical and physical deterioration.

The phosphor layer comprises a binder and a phosphor dispersed therein. The phosphor is in the form of small particles, and emits light of high luminance when excited with a radiation such as X-rays. The phosphor particles emit light of high luminance in proportion to the dose of radiation supplyed through an object. The X-ray film positioned in close contact with the intensifying screen is exposed to the light emitted by the phosphor, in addition to direct exposure to the radiation supplyed through the object. Accordingly, the X-ray film can be exposed sufficiently to form the radiation image of the object, even if the radiation is applied to the object at a relatively small dose.

As to the radiographic intensifying screen having the principle structure as described above, it is desired that the screen shows a high radiographic speed, as well as provides an image of high quality (sharpness and graininess).

In the conventional process for the preparation of a radiographic intensifying screen, a phosphor layer of the intensifying screen is formed by dispersing phosphor particles in a binder using an appropriate solvent to give a coating dispersion, applying the coating dispersion onto a support, and drying the applied coating dispersion thereonto.

In the above-mentioned procedure for the preparation of the coating dispersion, however, there are such problems that it is considerably difficult to prepare a homogeneous dispersion of the phosphor particles, and that the phosphor particles are apt to sediment independently or in the agglomerated form with the lapse of time, and as a result, cakes of the agglomerated phosphor particles produce. The so produced cakes of the agglomerated phosphor particles make it difficult to apply the coating dispersion uniformly onto the support. Further, the cakes of the agglomerated phosphor particles deteriorates the radiation speed of the resultant radiographic intensifying screen and the quality of image provided thereby. Especially, the above-mentioned tendency of sedimentation of phosphor particles is noted in the case of using phosphor particles having a high specific gravity.

For improvement of the dispersibility of the phosphor particles in a coating dispersion, a method of adding to the coating dispersion a dispersing agent such as phthalic acid, stearic acid, caproic acid or a hydrophobic surface active agent is proposed, and employed in practice.

SUMMARY OF THE INVENTION

A primary object of the present invention is to provide a process for the preparation of a radiographic intensifying screen, which is improved in or free from the aforementioned problems in the procedure of preparation of a coating dispersion for a phosphor layer.

Another object of the invention is to provide a process for the preparation of a radiographic intensifying screen, in which the formation of a uniform phosphor layer comprising homogeneously dispersed phosphor particles can be easily achieved.

There is provided by the invention a process for the preparation of a radiographic intensifying screen comprising a support and a phosphor layer, which comprises:

preparing a coating dispersion containing phosphor particles, a particulate hydrophobic silica in an amount of not more than 2% by weight of the phosphor particles, and a binder; and applying the coating dispersion onto the support to form a phosphor layer.

According to the present invention, the dispersibility of phosphor particles in a coating dispersion employed for forming the phosphor layer can be remarkably improved by incorporating into the coating dispersion a particulate hydrophobic silica in a specific amount. Further, by the incorporation of the particulate hydrophobic silica, the coating dispersion substantially free from the sedimentation of the phosphor particles therein can be easily prepared. Accordingly, the process of the invention is substantially free from the aforementioned problems in the coating procedure, and thus a uniform phosphor layer can be easily formed.

A coating dispersion for a phosphor layer is generally prepared by mixing phosphor particles and a binder in an appropriate solvent. Then the coating dispersion is applied to a surface of a support using a doctor blade, roll coater, knife coater or the like, to form a phosphor layer. In the procedure of the preparation of the coating dispersion, the phosphor particles are not sufficiently dispersed in the binder solution, and the particles are apt to sediment with the lapse of time. That is, the phosphor particles agglomerate to form a cake in the coating dispersion, and therefore, it is difficult to apply the coating dispersion uniformly onto the support. Especially, such a tendency is noted in the case of using phosphor particles having a high specific gravity.

As the result of the investigations of the present inventors, it was found tht the above-mentioned problems in the coating procedure caused by the sedimentation or the agglomeration of phosphor particles in a coating dispersion, and the resulting deterioration of characteristics of the resulting radiographic intensfying screen can be effectively obviated by a process involving the addition of a particulate hydrophobic silica to the phosphor dispersion in an amount of not more than 2% by weight of the phosphor particles and the subsequent formation of a phosphor layer using so prepared coating dispersion.

Further, it was found that the above-mentioned improvements are accomplished without substantial deterioration of flowability of the coating dispersion and also without substantial reduction of the radiographic speed of the intensifying screen prepared by the process.

DESCRIPTION OF THE PREFERRED EMBODIMENT

The process for the preparation of a radiographic intensifying screen of the present invention can be carried out, for instance, in the following manner.

At first, phosphor particles and a binder are added to an appropriate solvent, and then, they are mixed to prepare a dispersion in which the phosphor particles are dispersed in the binder solution.

A variety of phosphors employable for a radiographic intensifying screen have been known. Such various phosphors can be employed in the present invention without any specific restriction. Examples of the phosphor preferably employable in the invention include:

tungstate phosphors such as $CaWO_4$, $MgWO_4$ and $CaWO_4:Pb$;

terbium activated rare earth oxysulfide phosphors such as $Y_2O_2S:Tb$, $Gd_2O_2S:Tb$, $La_2O_2S:Tb$, $(Y,Gd)_2O_2S:Tb$ and $(Y,Gd)_2O_2S:Tb,Tm$;

terbium activated rare earth phosphate phosphors such as $YPO_4:Tb$, $GdPO_4:Tb$ and $LaPO_4:Tb$;

terbium activated rare earth oxyhalide phosphors such as $LaOBr:Tb$, $LaOBr:Tb,Tm$, $LaOCl:Tb$, $LaOCl:Tb,Tm$, $GdOBr:Tb$ and $GdOCl:Tb$;

thulium activated rare earth oxyhalide phosphors such as $LaOBr:Tm$ and $LaOCl:Tm$;

barium sulfate phosphors such as $BaSO_4:Pb$, $BaSO_4:Eu^{2+}$ and $(Ba,Sr)SO_4:Eu^{2+}$;

divalent europium activated alkaline earth metal phosphate phosphors such as $Ba_3(PO_4)_2:Eu^{2+}$ and $(Ba,Sr)_3(PO_4)_2:Eu^{2+}$;

divalent europium activated alkaline earth metal fluorohalide phosphors such as $BaFCl:Eu^{2+}$, $BaFBr:Eu^{2+}$, $BaFCl:Eu^{2+},Tb$, $BaFBr:Eu^{2+},Tb$, $BaF_2.BaCl_2KCl:Eu^{2+}$, $BaF_2BaCl_2xBaSO_4KCl:Eu^{2+}$ and $(Ba,Mg)F_2BaCl_2KCl:Eu^{2+}$;

iodide phosphors such as $CsI:Na$, $CsI:Tl$, $NaI:Tl$ and $KI:Tl$;

sulfide phosphors such as $ZnS:Ag$, $(Zn,Cd)S:Ag$, $(Zn,Cd)S:Cu$ and $(Zn,Cd)S:Cu,Al$; and hafnium phosphate phosphors such as $HfP_2O_7:Cu$.

The above-described phosphors are given by no means to restrict the phosphor employable in the present invention. Any other phosphors can also be employed, provided that the phosphors that the phosphors emit light in the visible and/or near ultra-violet region when exposed to a radiation. Particularly preferred are phosphors having a high specific gravity such as $Gd_2O_2S:Tb$, $BaFBr:Eu^{2+}$ and $CaWO_4$.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate. nitrocellulose, ethylcellulose, vinylidene chloride-vinyl chloride copolymer, polymethyl methacrylate, vinyl chloride-vinyl acetate copolymer, polyurethane, cellulose acetate butyrate, polyvinyl alcohol, and linear polyester. Particularly preferred are nitrocellulose, linear polyester, and a mixture of nitrocellulose and linear polyester.

Examples of the solvent employable in the preparation of the coating dispersion include lower alcohols such as methanol, ethanol, n-propanol, and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethylene glycol monoethylether and ethylene glycol monoethylether; and mixtures of the above-mentioned compounds.

The ratio between the binder and the phosphor in the dispersion may be determined according to the characteristics of the radiographic intensifying screen to be obtained and nature of the phosphor employed. Generally, the ratio therebetween is in the range of from 1:1 to 1:100 (binder:phosphor, by weight), preferably from 1:8 to 1:40.

Then, hydrophobic silica in the form of small particles is added to the aforementioned dispersion in an amount of not more than 2% by weight of the phosphor contained in the dispersion, and they are mixed well by means of a ball mill, impeller mill, roll mill or the like to prepare a coating dispersion. The hydrophobic silica is preferably employed in an amount ranging from 0.01 to 1.0% by weight of the phosphor, and more preferably from 0.1 to 0.5 by weight of the same.

Particulate hydrophobic silica preferably employable in the present invention is, one which is in the form of primary particles, having the mean particle diameter in the range of from 5 to 80 $\mu m$.

Exasmples of the hydrophobic silica employable in the invention includes a particulate silica treated with dimethyl dichlorosilane, octyl trimethoxysilane or trimethyl hexamethyl disilazane.

The hydrophobic silica employed in the present invention neither reacts with a solvent in a coating dispersion, nor forms hydrogen bond with the solvent. Further, chemical adsorption of the solvent by the hydrophobic silica hardly takes place. Since the hydrophobic silica employed in the invention is in the form of extremely small particles, the dispersibility of the phosphor particles in the coating dispersion is imploved and the sedimentation of the phosphor particles is effectively obviated without substantial variation of the flowability of the coating dispersion. Especially, the incorporation of hydrophobic silica according to the invention effectively prevents the sedimentation of phosphor particles having a high specific gravity.

The hydrophobic silica employed in the invention is a white powder and, when exposed to a radiation such as X-rays, the hydrophobic silica neither absorbs the radiation nor emits light. Further, since the hydrophobic silica is not hygroscopic, the incorporation of the hydrophobic silica according to the present invention does not deteriorate the phosphor particles contained in the phosphor layer and thus does not reduce the radiographic speed of an intensifying screen.

In addition to the hydrophobic silica, the coating dispersion may contain a dispersing agent to assist the dispersibility of the phosphor particles contained therein. Examples of the dispersing agent include phthalic acid, stearic acid, caproic acid and hydrophobic surface active agents.

The coating dispersion may also contain a variety of additives such as a plasticizer for increasing the adhesion between the binder and the phosphor particles in the phosphor layer. Examples of the plasticizer include phosphates such as triphenyl phosphate, tricresyl phosphate and diphenyl phosphate; phthalates such as dietyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

In the so prepared coating dispersion containing the phosphor particles, hydrophobic silica and binder, the dispersibility of the phosphor particles is remarkably enhanced, and the sedimentation of the phosphor particles hardly takes place. The flowability of the coating dispersion does not substantially vary as compared with that of the coating disperson not containing the hydrophobic silica. For these reasons, the phosphor particles hardly agglomerate to form a cake in the coating dispersion, and therefore, formation of a uniform phosphor layer can be easily to acchieved.

The coating dispersion containing the phosphor particles, hydrophobic silica and binder prepared as described above is applied uniformly onto the surface of a support to form a layer of the coating dispersion. The coating procedure can be carried out by a conventional method such as a method using a doctor blade, roll coater or knife coater.

The support material employed in the present invention can be selected from those employed in the conventional radiographic intensifying screens. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. Among these materials, a plastic film is preferably employed as the support material. The plastic film may contain a light-absorbing material such as carbon black, or may contain a light-reflecting material such as titanium dioxide. The former is appropriate for preparing a high sharpness type radiographic intensifying screen, while the latter is appropriate for preparing a high speed type radiographic intensifying screen.

In the conventional radiographic intensifying screen, one or more additional layers are occationally provided between the support and the phosphor layer, so as to enhance the adhesion between the support and the phosphor layer, or to improve the radiographic speed of the intensifying screen or the quality of the image provided thereby. For instance, a subbing layer or an adhesive layer may be provided by coating a polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the radiographic intensifying screens employed in the industrial radiography for the purpose of nondestructive test, a metal foil is optionaly provided on the phosphor layer side surface of the support, so as to remove scattered radiation. Such a metal foil is chosen from lead foil, lead alloy foil, tin foil and the like. In the invention, one or more of these additional layers may be provided depending on the type of the intensifying screen to be obtained.

After applying the coating dispersion onto the support, the coating dispersion is then heated slowly to dryness, so as to complete the formation of a phosphor layer. The thickness of the phosphor layer varies depending upon the characteristics of the intensifying screen to be obtained, nature of the phosphor, the ratio between the binder and the phosphor, etc. Generally, the thickness of the phosphor layer is in the range of from 20 $\mu$m to 1 mm, preferably from 50 to 500 $\mu$m.

The phosphor layer can be provided on the support by the methods other than that given in the above. For instance, the phopshor layer is initially prepared on a sheet such as a glass plate, metal plate or plastic sheet by the use of the aforementioned coating dispersion and then, so prepared phosphor layer is laminated on the support by pressing or by using an adhesive agent.

The conventional radiographic intensifying screens generally has a transparent film on the free surface of the phosphor layer to protect the phosphor layer from physical and chemical deterioration. Accordingly, the radiographic intensifying screen of the present invention likewise has such a transparent film for the same purpose.

The transparent film can be provided onto the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate or vinyl chloride-vinyl acetate copolymer), and drying the solution coated thereover. Otherwise, a trans-parent film prepared independently from a polymer such as polyethylene terephthalate, polyethylene, polyvinylidene chloride, polyamide can be placed and fixed onto the support by the use of an appropriate adhesive agent to provide the protective film. The transparent protective film preferably has a thickness in the range of approximately 3 to 20 $\mu$m.

The present invention will be further described referring to the following examples, which are by no means intended to restrict the invention.

EXAMPLE 1

A dispersion containing a particulated terbium activated gadolinium oxysulfide phosphor ($Gd_2O_2S$:Tb), a linear polyester resin (a mixture of Byron 500 and Byron 200 in the ratio of 17:3 by weight, Byron 500 & 200: tradenames, produced by Toyobo Co., Ltd., Japan) and nitrocellulose (nitrofication degree: 11.5%) in the ratio of 20:1 by weight was prepared by adding metyl ethyl ketone and the nitrocellulose to the mixture of the phosphor particles and the polyester resin under rough stirring. To the phosphor dispersion was then added a hydrophobic silica having a mean particle diameter of approximately 16 $\mu$m (AEROSIL R-972, tradename, produced by Japan Aerosil Co., Ltd.) in the amount of 0.05% by weight of the phosphor particles, and further tricresyl phosphate, n-butanol and methyl ethyl ketone were added thereto. The resultant mixture was sufficiently stirred by means of a propeller agitater to obtain a homogeneous coating dispersion having a viscosity of 30 PS (at 25° C.) (Coating Dispersion No. 1).

The coating dispersion thus obtained was applied onto a polyethylene terephthalate sheet containing carbon powder (support, thickness: 250 $\mu$m) placed horizontally on a glass plate. The coating procedure was carried out using a doctor blade. Thereafter, the support carring the coating dispersion was placed in an oven and heated at a temperature gradually increasing from 25° to 100° C. Thus, a phosphor layer having the thickness of approximately 120 $\mu$m was formed on the support.

On the phosphor layer of the support was placed a transparent polyethylene terephthalate film (thickness: 12 $\mu$m; provided with a polyester adhesive layer) to laminate the transparent film thereon through the adhesive layer.

Thus, a radiographic intensifying screen comprising a support, a phosphor layer and a transparent protective film was prepared (Screen No. 1).

Coating Dispersions No. 2 through No. 6 containing the hydrophobic silica in the amount set forth in Table 1 were prepared by the same procedure as described above. Using so prepared coating dispersions, Screens No. 2 through No. 6 were prepared in the same manner as described above. Coating Dispersion No. 6 and Screen No. 6 were prepared as reference.

TABLE 1

| Coating Dispersion No. | Hydrophobic Silica (% by weight of the phosphor) |
|---|---|
| 1 | 0.05% |
| 2 | 0.1% |
| 3 | 0.2% |
| 4 | 0.3% |
| 5 | 0.5% |
| 6 | 0% |

Coating Dispersions No. 1 through No. 6 prepared as described above were evaluated on the liquid specific gravity by the following test as described below.

The coating dispersion was charged into a cylinderical container to the height of 30 cm from the bottom, stirred for 30 min. by means of a propeller agitater, and then allowed to stand for 5 hours. The dispersion in the container was imaginarily divided into three parts having the same volume from the bottom of the container, namely, an upper part, a middle part and a lower part. From each of these three parts, a small amount of the dispersion was taken out with a pipet and measured on the liquid specific gravity.

Screens No. 1 through No. 6 prepared as described above were evaluated on the radiographic speed upon exposure to X-rays at 80 KVp.

The results on Coating Dispersions No. 1 through No. 6 and Screens No. 1 through No. 6 are set forth in Table 2, in which the amount of the hydrophobic silica is indicated in terms of % by weight based on the weight of the phosphor.

TABLE 2

|  | No. 1 | No. 2 | No. 3 | No. 4 | No. 5 | No. 6 |
|---|---|---|---|---|---|---|
| Hydrophobic silica % | 0.05 | 0.1 | 0.2 | 0.3 | 0.5 | 0 |
| Liquid Specific Gravity |  |  |  |  |  |  |
| Upper Part | 2.20 | 3.00 | 3.25 | 3.23 | 3.20 | 0.99 |
| Middle Part | 3.33 | 3.32 | 3.32 | 3.33 | 3.33 | 3.32 |
| Lower Part | 4.15 | 3.85 | 3.55 | 3.50 | 3.35 | 4.38 |
| Agglomerated Cakes | none | none | none | none | none | observed |
| Relative Radiographic speed | 398 | 395 | 393 | 390 | 360 | 400 |

COMPARISON EXAMPLE 1

The procedure of Example 1 was repeated except that the hydrophobic silica was replaced with hydrophilic silica having a mean particle diameter of approximately 7 $\mu$m (AEROSIL 380, tradename, produced by Japan Aerosil Co., Ltd.) in an amount of 0.05% by weight of the phosphor, to prepare a coating dispersion (Coating Dispersion No. 7).

Subsequently, a radiographic intensifying screen comprising a support, a phosphor layer and a transparent protective film was prepared in the same manner as described in Example 1 (Screen No. 7).

Coating Dispersion No. 8 through No. 11 containing the hydrophilic silica in the amount set forth in Table 3 were prepared by the same procedure as described above. Using so prepared Coating Dispersions No. 8 through No. 11, Screens No. 8 through No. 11 were respectively prepared in the same manner as described above.

TABLE 3

| Coating Dispersion No. | Hydrophilic Silica (% by weight of the phosphor) |
|---|---|
| 7 | 0.05% |
| 8 | 0.1% |
| 9 | 0.2% |
| 10 | 0.3% |
| 11 | 0.5% |

Coating Dispersions No. 7 through No. 11 prepared as described above were evaluated on the liquid specific gravity by the above-mentioned test.

Screens No. 7 through 11 prepared as described above were evaluated on the radiographic speed upon exposure to X-rays at 80 KVp.

The results on Coating Dispersions No. 7 through No. 11 and Screens No. 7 through No. 11 are set forth in Table 4. In Table 4, the amount of the hydrophilic silica is indicated in terms of % by weight based on the weight of the phosphor, and the term "obs." means "observed".

TABLE 4

|  | No. 7 | No. 8 | No. 9 | No. 10 | No. 11 | No. 6 |
|---|---|---|---|---|---|---|
| Hydrophilic silica (%) | 0.05 | 0.1 | 0.2 | 0.3 | 0.5 | 0 |
| Liquid Specific Gravity |  |  |  |  |  |  |
| Upper Part | 0.92 | 1.29 | 2.01 | 2.59 | 2.60 | 0.99 |
| Middle Part | 3.31 | 3.32 | 3.29 | 3.31 | 3.35 | 3.32 |
| Lower Part | 4.38 | 4.22 | 3.96 | 3.88 | 4.02 | 4.38 |
| Agglomerated Cakes | obs. | obs. | obs. | obs. | obs. | obs. |
| Relative | 390 | 385 | 378 | 350 | 300 | 400 |

TABLE 4-continued

| | No. 7 | No. 8 | No. 9 | No. 10 | No. 11 | No. 6 |
|---|---|---|---|---|---|---|
| Radiographic speed | | | | | | |

As is evident from the results set forth in Table 2, the coating dispersions (No. 1 through No. 5) prepared by the process of the present invention show distinctly high dispersibility of phosphor particles as compared with the conventional coating dispersion (No. 6) not containing the hydrophobic silica. In the conventional coating dispersion (No. 6), the phosphor particles sedimented noticiably and some agglomerated cakes of phosphor particles were produced in the lower part of the dispersion. In the coating dispersions (No. 1 through No. 5) prepared by the process of the invention, on the contrary, the extent of sedimentation of phosphor particles decreased and no agglomerated cakes were observed. Especially when the hydrophobic silica is employed in the amount ranging from 0.1 to 0.5% by weight of the phosphor, the coating dispersion is substantially free from sedimentation of phosphor particles.

Each of the radiographic intensifying screens (No. 1 through No. 5) prepared by the process of the present invention using the above-mentioned coating dispersions (No. 1 through No. 5) respectively shows almost the same radiographic speed as that of the conventional intensifying screen (No. 6).

The results set forth in Table 2 and Table 4 clearly indicate that the coating dispersions (No. 7 through No. 11) containing the hydrophilic silica are inferior to the coating dispersions (No. 1 through No. 5) containing the hydrophobic silica according to the invention, in the dispersibility of the phosphor particles. In all the coating dispersions (No. 7 through No. 11), the phosphor particles sedimentated markedly and agglomerated cakes were produced.

The radiographic intensifying screens (No. 7 through No. 11) prepared using the above-mentioned coating dispersions (No. 7 through No. 11) respectively are inferior to the radiographic intensifying screens (No. 1 through No. 5) prepared by the process of the invention, in the radiographic speed.

In other words, the coating dispersions (No. 1 through No. 5) prepared by the process of the invention show extremely high dispersibility of phosphor particles and the sedimentation of phosphor particles in all the coating dispersions is prevented.

We claim:

1. A process for the preparation of a radiographic intensifying screen comprising a support and a phosphor layer, which comprises:
    preparing a coating dispersion containing phosphor particles, a particulate hydrophobic silica in an amount of not more than 2% by weight of the phosphor particles, and a binder; and
    applying the coating dispersion onto the support to form a phosphor layer.

2. A process as claimed in claim 1, in which the particulate hydrophobic silica is contained in an amount ranging from 0.01 to 1.0% by weight of the phosphor particules.

3. A process as claimed in claim 2, in which the particulate hydrophobic silica is contained in an amount ranging from 0.1 to 0.5% by weight of the phosphor particles.

4. A process as claimed in any one of claims 1 through 3, in which the phosphor is a terbium activated gadolinium oxysulfide phosphor.

* * * * *